Patented Jan. 31, 1933                                                      1,895,580

UNITED STATES PATENT OFFICE

MICHAEL JAMES MARTIN, OF ARMADALE, VICTORIA, AND HARRY PERCIVAL BROOKS-BANK, OF MERLYNSTON, NORTH COBURG, VICTORIA, AUSTRALIA, ASSIGNORS TO SULPHATES PROPRIETARY LIMITED, OF MELBOURNE, VICTORIA, AUSTRALIA

TREATMENT OF BAUXITE, ALUNITE, AND LIKE ALUMINOUS MATERIAL

No Drawing. Application filed December 11, 1929, Serial No. 413,417, and in Australia December 22, 1928.

This invention relates to improvements in the treatment of bauxite, alunite, and refers especially to the treatment of such materials for the production of alkaline aluminates and other aluminium compounds.

The term "bauxite" is employed herein to denote aluminous minerals containing $Al_2O_3$ and usually varying amounts of ferric oxide, titanic oxide and silica.

Attempts have previously been made to treat mixtures of bauxite and alkali sulphates for the recovery of alkali metal aluminates, but such processes have not proved commercially successful.

Now, the object of the present invention is to provide an improved process for the treatment of bauxite and other aluminous materials whereby alkaline earth metal and alkali metal aluminates and other aluminium compounds and marketable by-products will be obtained in a condition suitable for many industrial purposes.

We accomplish this object by intimately mixing a suitable aluminous material, such as bauxite or alunite with alkali metal acid sulphates or with alkali metal and alkaline earth metal sulphates with free sulphuric acid, and subjecting the mixture to heat in an atmosphere of reducing gas, whereby an alkali metal or alkaline earth metal aluminate is formed.

By employing a reducing gas under the above-mentioned conditions for effecting the reduction of the sulphate, the operation of processing can be readily controlled, which heretofore has not been possible.

After the reducing operation, the material is preferably subjected to controlled oxidation.

The product is preferably lixiviated to remove impurities therefrom and the alkaline aluminate liquor thus formed is treated with $CO_2$ for the recovery of hydrated alumina and the production of alkaline carbonate; or alternatively, it may be otherwise treated as hereinafter indicated according to the end products desired.

Salient features of the invention consist in forming the mixture of aluminous material and alkaline sulphate with sulphuric acid into briquettes or nodules to facilitate processing, and in the recovery of the gases liberated during the reaction.

A further feature of the invention resides in performing the reducing operation whilst the briquettes or nodules are arranged in columnar form, as in a vertical shaft furnace.

The process is preferably carried out continuously, the briquettes being passed progressively through zones in which the various reactions take place, and the reducing gases and gaseous products of reaction passing in a counter direction to the movement of the briquettes.

When sodium sulphate is employed for the purposes of the present invention, it is preferably provided in the form of "nitre cake" which is crushed to a suitable size (e. g. $\frac{1}{2}''$ mesh) and mixed with approximately an equal weight of crushed bauxite, the molecular proportion being approximately 1.1 mol. $Na_2O$ to 1 mol. $Al_2O_3$. This proportion facilitates the furnace operations although a higher yield of alumina may be obtained by using proportions of up to approximately 1.5 mol. $Na_2O$ to 1 mol. $Al_2O_3$ as hereinafter explained.

As previously stated, normal sodium sulphate may be utilized in lieu of the acid sulphate, in which case a desired proportion of free sulphuric acid is added thereto.

The crushed mixture is then fed to a pulverizer by which it is ground to an approved degree of fineness.

If desired, the bauxite and nitre cake may be pulverized before being mixed but it is preferred to mix the crushed materials as above indicated.

A suitable proportion of water (say approx. 5%) is then added and intimately mixed with the powdered material which is then formed into briquettes or nodules by means of suitable apparatus. It has been found in practice that good results are obtained from cylindrical briquettes about $1\frac{1}{4}''$ in diameter and $1\frac{1}{4}''$ in length.

The briquettes are hardened either by drying in a furnace or oven for about 1 or 2 hours at a suitable temperature (e. g. about 100° C.) or by allowing same to stand for 2 or 3 days according to atmospheric conditions and the degree of hardness required. If, however, sufficient pressure is employed in the briquetting apparatus, the briquettes can be passed direct to the reduction furnace without a preliminary drying treatment.

The furnace, to which the hardened briquettes or nodules are charged, is of any approved type or construction in which the desired reactions can be effected, and it has been found that a vertical shaft furnace gives satisfactory results. The briquettes fed to the top of the furnace descend by gravity and the red hot reducing gas flows counter thereto, i. e. upwardly from the lower end of the furnace.

It may be understood however that the furnace may be arranged horizontally and the material fed therethrough by any approved means.

Any approved reducing gas may be employed for this purpose, such as water gas or producer gas, which is preferably employed at about the temperature at which it leaves the generating plant.

The reducing gas should preferably be highly concentrated or relatively free of inert constituents; for this reason it is preferred to use water gas as the reducing agent, although ordinary producer gas or coal gas may be employed for this purpose.

In one application of the invention, the furnace is provided with an annular flue surrounding the central shaft of the furnace and in which producer gas, produced simultaneously with the water gas, is burnt to increase the reaction temperature, the hot water gas being delivered to the reaction chamber of the furnace as previously explained.

Upon the completion of the reducing operation, the briquettes or nodules are preferably subjected to a blast of air by means of which such sulphides as have been formed are eliminated.

This oxidizing operation is preferably carried out quickly, the blast of air being advantageously applied to relatively thin layers of briquettes or nodules (say not more than 1 foot in thickness) immediately the same have been removed from the furnce.

By performing the oxidizing operation outside the reducing furnace, the reduction may be carried out as a continuous operation; and furthermore, the reaction which would otherwise occur between the $SO_2$ formed during oxidation and the sodium aluminate in the hot zone of the reduction furnace is obviated.

It is preferred to carry out this oxidizing operation in a separate furnace or chamber and, when cooled, the briquettes should be protected from air currents.

The gases passing from the reducing furnace consist mainly of $CO_2$, $H_2O$ and S, together with some $SO_2$. Consequently, most of the sulphur present in the sulphate can be readily recovered as elemental sulphur.

If desired, the carbon dioxide may be recovered by known means.

The briquettes or nodules, after being treated in the manner above set forth, are lixiviated for the removal of insoluble impurities, although, for certain requirements, the briquettes are crushed and used direct as crude sodium aluminate.

In order to obviate loss of alumina, the lixiviation should be carried out as quickly as possible, the liquid then being immediately removed from the residue by filtration or by centrifugal force.

In order to attain these objects, it is preferred to crush or powder the briquettes and dissolve same in boiling water.

When sodium aluminate is the product desired, it is retained in the form of a solution as obtained from the lixiviation vats or alternatively it may be evaporated to a syrupy consistency as desired for certain industrial purposes, or again the evaporation may be continued to dryness in order to obtain pure sodium aluminate which is pulverized to suit market requirements.

When it is desired to recover alumina from the sodium aluminate liquor, the latter is treated with $CO_2$ for the precipitation of hydrated alumina and the formation of sodium carbonate which can be readily recovered by evaporation, in the form of soda crystals.

The hydrated alumina are dried for market purposes or alternatively they may be digested with sulphuric acid for the manufacture of sulphate of alumina free from iron.

If desired, the sodium aluminate liquor may be treated by the well known Bayer process of hydrolysis for the recovery of alumina.

As previously stated, a higher yield of alumina is obtained by mixing bauxite, alunite or the like in the molecular proportions of up to approximately 1.5 mol. $Na_2O$ to 1 mol. $Al_2O_3$.

When this is done, it is preferred to add the additional $Na_2O$ in the form of salt cake ($Na_2SO_4$) in order to prevent the briquettes fusing in the furnace.

When working under these conditions, the sodium aluminate solution obtained is concentrated by approved means whereby the ($Na_2SO_4$) present in the solution will be precipitated whilst any $Al_2(OH)_6$ that may have precipitated previously will tend to go into solution again.

The sodium sulphate recovered in this manner can be used again for the purpose of increasing the molecular proportion of $Na_2O$ in the mixture of raw materials as above set forth.

It will be understood that the operations above described are capable of modification by those skilled in the art and we, therefore, do not wish to be understood as limiting ourselves by the specific examples given herein.

We claim—

1. In the production of alkaline earth metal aluminates, the process of intimately mixing a substance of the bauxite alunite type with a suitable proportion of an alkaline sulphate with free sulphuric acid, forming said mixture into briquettes, subjecting the briquettes to the action of hot reducing gases, then subjecting the briquettes to an oxidizing atmosphere and lixiviating the crude alkaline aluminate; the materials used being crushed to such a size as to pass through a half inch mesh before being pulverized to a suitable degree of fineness.

2. A process according to claim 1 wherein the briquettes are delivered to the top of a reducing furnace of the vertical shaft type, and said hot reducing gases passed in a reverse direction through the furnace.

3. A process according to claim 1, wherein the briquettes or nodules are passed through a reducing furnace in opposition to the current of reducing gases.

4. A process according to claim 1, wherein water gas is employed as the reducing agent.

5. A process according to claim 1, wherein the briquettes are passed through a reducing furnace in opposition to the current of reducing gases and are removed from the reduction furnace before being subjected to the oxidizing treatment.

6. A process according to claim 1, wherein the briquettes are passed through the reducing furnace in opposition to the current of reducing gases and wherein the oxidizing treatment is carried out in a separate furnace or chamber.

7. A process according to claim 1, wherein the materials are mixed in approximately the molecular proportions of 1.1 mol. $Na_2O$ to 1 mol. $Al_2O_3$.

8. A process according to claim 1, wherein the materials are mixed in approximately the molecular proportions of 1.5 mol. $Na_2O$ to 1 mol. $Al_2O_3$.

9. In the process according to claim 1, mixing the materials approximately in the molecular proportions of 1.5 mol. $Na_2O$ to 1 mol. $Al_2O_3$ and concentrating the alkaline alumina liquor to precipitate and recover ($Na_2SO_4$) therefrom.

10. The process according to claim 1 wherein about 4% to 5% of water is added to the mixture of aluminous material prior to forming same into briquettes.

11. The process according to claim 1 wherein the briquettes are removed from the reduction furnace and are arranged in relatively thin layers, whilst being subjected to the oxydizing atmosphere.

12. The process according to claim 1, wherein the briquettes are delivered to the top of a furnace of the vertical shaft type and removed from the bottom thereof after the completion of the reducing operations and said reducing gases pass in a reverse direction and the furnace is heated externally by the combustion of gas in an annular flue surrounding the central shaft thereof.

13. In the production of alkaline earth metal or alkali metal aluminates, the process of subjecting to the action of reducing gases with heat, a mixture of aluminous material, of the bauxite or alunite type, with a material selected from the group consisting of alkali metal acid sulphates, and alkali metal, and alkaline earth metal sulphates with free sulphuric acid.

14. In the production of alkaline earth metal, or alkali metal aluminates, the process of intimately mixing approved proportions of an aluminous material, of the bauxite or alunite type, with a material selected from the group consisting of alkali metal acid sulphates, and alkali metal, and alkaline earth metal sulphates with free sulphuric acid, forming the mixture into briquettes and subjecting the briquettes to heat in the presence of reducing gases.

15. In the production of alkaline earth metal, or alkali metal aluminates, the process of preparing a mixture of an aluminous material, of the bauxite or alunite type, and a material selected from the group consisting of alkali metal acid sulphates, and alkali metal and alkaline earth metal sulphates with free sulphuric acid, subjecting the mixture to the action of hot reducing gases, and then subjecting the mixture to the action of an oxidizing gas, such as air.

16. In the production of alkaline earth metal, or alkali metal aluminates according to claim 15, the further step of adding water to the mixture of said materials, and forming said mixture into briquettes before subjecting the same to the action of the said hot reducing gases.

17. In the production of alkaline earth metal, or alkali metal aluminates, the process of intimately mixing substances of the bauxite or alunite type, with a material selected from the group consisting of alkali metal acid sulphates, and alkali metal, and alkaline earth metal sulphates with free sulphuric acid, forming said mixture into briquettes, subjecting the briquettes to the action of hot reducing gases, then subjecting the briquettes to an oxidizing atmosphere and lixiviating the crude aluminate.

18. The process for the production of alkaline earth metal, or alkali metal aluminates according to claim 17, wherein the briquettes are delivered to the top of a reducing furnace of the vertical shaft type and are removed from the lower end thereof upon the completion of the reducing operation, and said hot reducing gases are passed in a reverse direction through the furnace.

19. In the production of sodium aluminate, the process of intimately mixing an aluminous material selected from the group comprising bauxite and alunite, with a material selected from the group consisting of sodium acid sulphate and sodium sulphate with free sulphuric acid, forming the mixture into briquettes, subjecting the briquettes to the action of hot reducing gases, then subjecting the briquettes to an oxidizing atmosphere, lixiviating the crude aluminate and treating the sodium aluminate liquor, obtained by lixiviation with $CO_2$ for the production of sodium carbonate and hydrated alumina.

20. In the process for the production of alkali metal aluminates according to claim 17, mixing the materials approximately in the molecular proportions of 1.5 mol. $Na_2O$ to 1 mol. $Al_2O_3$ and concentrating the alkaline aluminate liquor to precipitate and recover $Na_2SO_4$ therefrom.

21. In the production of alkaline earth metal, and alkali metal aluminates, the process of intimately mixing an aluminous material, of the bauxite or alunite type, with a suitable proportion of a material selected from the group consisting of alkali metal acid sulphates, and alkali metal, and alkaline earth metal sulphates with free sulphuric acid, forming said mixture into briquettes, passing the briquettes progressively through a furnace wherein they are subjected to a counter current of hot reducing gases, and then subjecting the product to the action of an oxidizing gas, characterized in that the gaseous products of the oxidizing process are not passed through the reducing furnace.

In witness whereof we hereunto affix our signatures.

MICHAEL JAMES MARTIN.
HARRY PERCIVAL BROOKSBANK.